United States Patent [19]

Schodl

[11] Patent Number: 4,840,486
[45] Date of Patent: Jun. 20, 1989

[54] APPARATUS FOR MEASURING FLOW VECTORS IN GAS CURRENTS

[75] Inventor: Richard Schodl, Troisdorf-Eschmar, Fed. Rep. of Germany

[73] Assignee: Deutsche Forschungs- und Versuchsanstalt fur Luft- und Raumfahrt e.V., Bonn, Fed. Rep. of Germany

[21] Appl. No.: 84,578

[22] Filed: Aug. 12, 1987

[30] Foreign Application Priority Data

Sep. 19, 1986 [DE] Fed. Rep. of Germany ....... 3631901

[51] Int. Cl.⁴ .......................................... G01N 21/53
[52] U.S. Cl. ..................................... 356/338; 356/28
[58] Field of Search .................... 356/28, 28.5, 338; 250/574, 227; 73/861.04, 861.05

[56] References Cited

U.S. PATENT DOCUMENTS 3,830,568 8/1974 Allen ................................. 356/28.5

FOREIGN PATENT DOCUMENTS 2109548 6/1983 United Kingdom .

OTHER PUBLICATIONS

R. G. W. Brown, E. R. Pike, Combined Laser Doppler and time of flight anemometer, 0030-3992/78/0603-17-03/PC Business Press.

Primary Examiner—Davis L. Willis
Assistant Examiner—Matthew W. Koren
Attorney, Agent, or Firm—Spensley Horn Jubas & Lubitz

[57] ABSTRACT

The apparatus contains a dispersion means (DP) decomposing the incident laser beam into a number of colors (C1-C5) spacially separated from each other. The focusing points of said colors are subsequently traversed by particles contained in the flow. The light from the measuring volume (MV) is conducted via the dispersion means to a light receiving means (AV) in which the light is decomposed again into the individual colors. Due to a switching means (SE), the colors used for the measurement are selectible. Thus, the space of the focusing points used for the measurement may be varied.

25 Claims, 3 Drawing Sheets

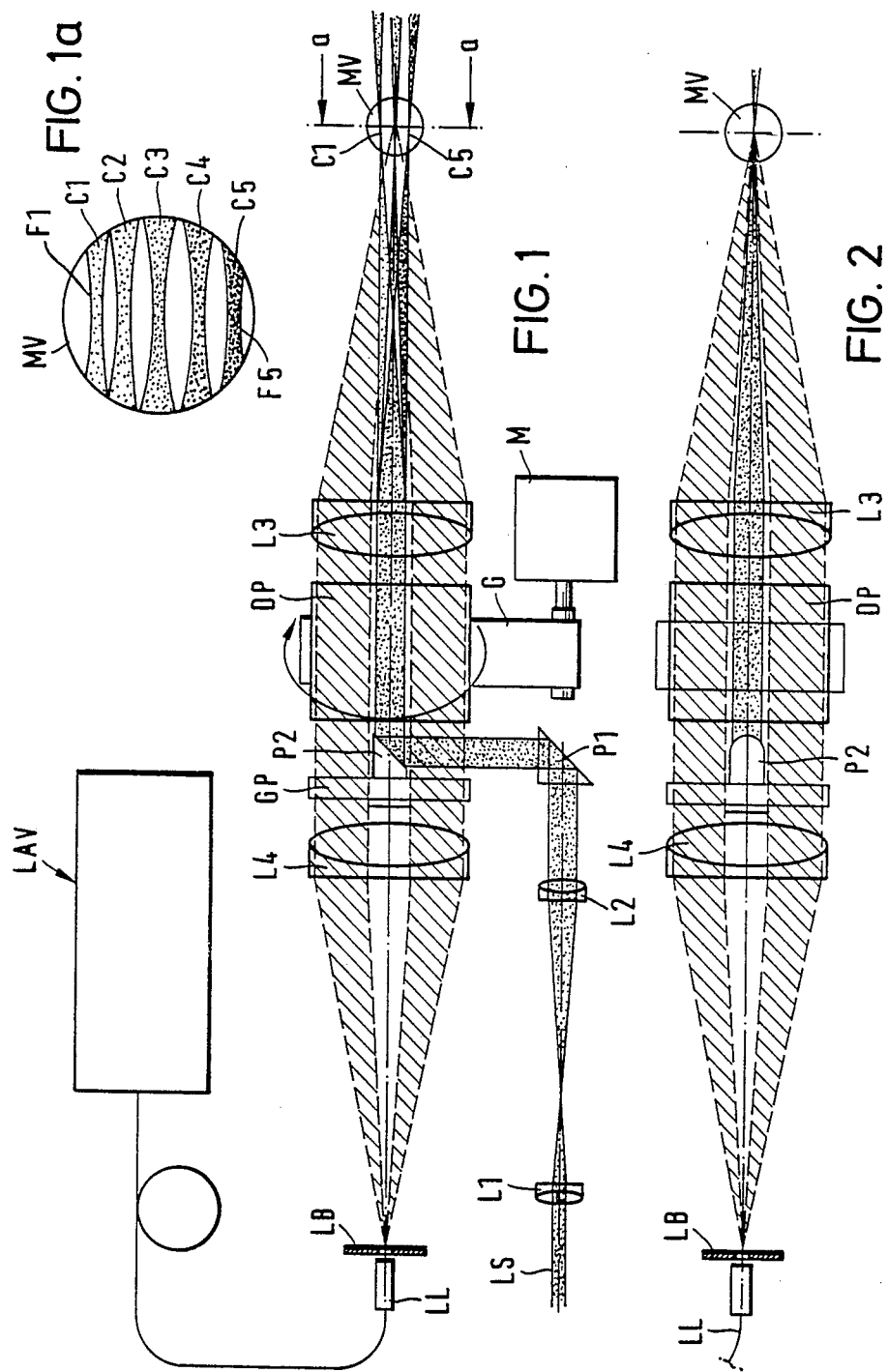

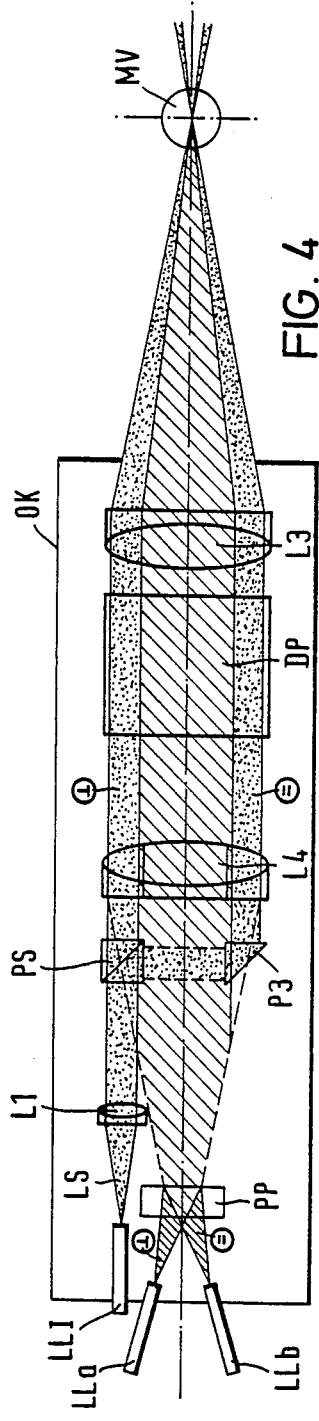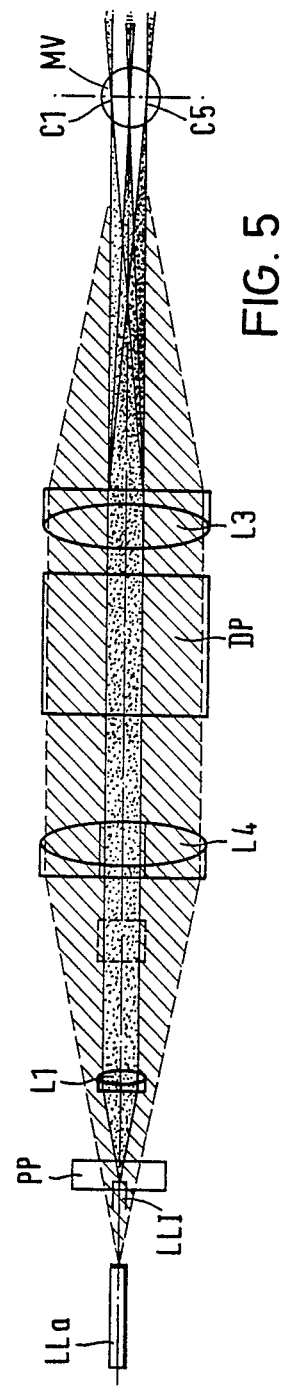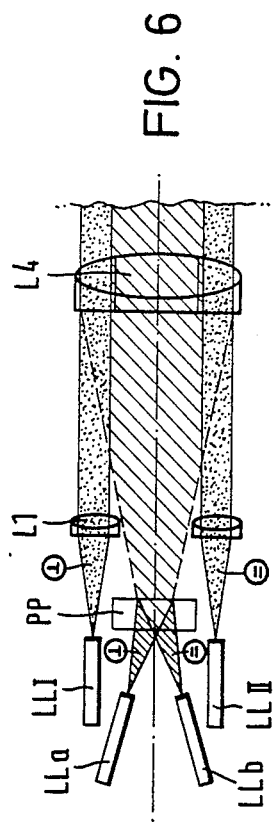

APPARATUS FOR MEASURING FLOW VECTORS IN GAS CURRENTS

BACKGROUND OF THE INVENTION

I. Field of the Invention

The invention relates to an apparatus for measuring flow vectors in gas currents.

II. Description of Related Art

U.S. Pat. No. 3,941,477 discloses an optical device in which a light beam emitted from a light source is divided into two partial beams, each of which is focused in the measuring volume. Solid particles contained in the flow and traversing a focusing point, flash up, and said flash up is detected by an analyzer. If the flow vector of a particle is in alignment with a straight line traversing both focusing points, there is produced a start pulse at the first focusing point and a stop pulse at the second focusing point. From the time interval between said pulses, one may detect the flow rate; i.e., the vector amount. The measuring process involved with said two focus-processes is quite time-consuming. In fact, only such flow vector components which are situated in a plane extending vertically to the optical axis of the system may be measured. Said plane must be determined by a series of measurements. The vector component extending in parallel to the optical axis cannot be determined.

British Patent No. 2,109,548 describes a further development of the stated double-focus process. According to said British patent, it is also possible to measure a flow vector component extending in parallel to the optical axis of the system so that the flow vectors may be determined completely as to amount and direction. In this process, called the three component process, a multicolored laser beam is split into two components of different colors. Each of said components is split up into partial beams which are polarized vertically to each other. Thus, there are formed four partial beams in total of which two always intersect in the measuring volume and form a focusing point. One focusing point is situated on the optical axis of the system. By turning an image rotating prism, the position of the other focusing point may be easily changed. In order to evaluate the flashes produced by the flowing particles, the radiation of said flashes is selected subject to polarization and color in order to generate the start and stop pulses.

Not only in case of the double-component process, but also in the three-component process, the distance between the focusing points is dictated by the beam splitter employed for generating, from the laser beam, two differently colored partial beams. The beam splitter being a Rochon prism, may be exchanged, if necessary. In case of the three-component process, it is additionally necessary to adjust a deflecting mirror containing a focusing diaphragm and having holes to allow the passage of the two differently colored laser beams and to reflect the returning light beams in order to laterally guide them out of the optical system. The measuring time may be reduced considerably if the distance of the focusing points in the measuring volume is conformed with the flow turbulences. However, in the known devices, such changes of the beam distance are accompanied by a considerable waste of time for assembly and adjustment operations which cannot be made during a measuring campaign.

SUMMARY OF THE INVENTION

It is an object of the invention to further develop an apparatus for measuring flow vectors in gas currents wherein distances between beams may be varied in the measuring volume without interfering with the optical system.

In the preferred embodiment of the present invention, a multicolored laser beam is split by a dispersion means into a number of differently colored partial beams whose focusing points are mutually spaced. From the plurality of differently colored partial beams, two optional beams may be selected to produce the start and stop pulses. Preferably, the focusing points of the individual colors are spaced unequally. Thus, by suitably selecting combinations of two focusing points, the beam distance is variable for instance over ten nearly equidistant steps. The various beams may be produced by color splitting the laser beam of a gas laser (e.g., $Ar^+$-laser) which is operating in a multiline performance. The apparatus of the preferred embodiment of the invention is operating according to a multicolor principle. The preferred embodiment of the invention is suited for the double-component process as well as for the three-component process.

According to the preferred embodiment of the invention, any optional combination of two beams may be selected from the corresponding existing beams, while the other beams remain unused. Thus, the distance between the focusing points may be changed without interfering with the optical system. Further, measurements in turbulent currents may be made with the most favorable beam distance (distance between the focusing points). It is to be taken into account that, in case of a great beam distance, more accurate measurements concerning amount and direction of a flow vector may be realized. However, in turbulent flows, the flow vectors change in such short intervals that the measuring distance (distance between two focusing points) must be shortened.

It is particularly advantageous that the dispersion means for splitting the beams may be used in both directions. The differently colored returning beams are combined by the dispersion means to form one sole beam which, subsequently, may be split again into its color components in the light receiver. By a selection device, the two color components of interest may be selected and supplied to the evaluating means. If the vector direction is intended to be changed, it is only necessary to rotate the dispersion unit about the optical axis of the system. Alternatively, the dispersion means together with other optical components may be accommodated in a tubular measuring head rotatable in total about its longitudinal axis. As a result, the optical portion of the apparatus may be of a reduced design so that measurements are possible even at small flow channels of difficult access, and further, in case of the three-component process, one need not include the voluminous image rotating prism producing stay beams, thus permitting flow measurements to be carried out near the flow channel walls.

BRIEF DESCRIPTION OF THE DRAWINGS

Embodiments of the invention will be explained hereunder in more detail with reference to the drawings in which FIG. 1 is a schematic side view of the optical system of a measuring device which operates according to one embodiment of the two-component system, FIG. 1a is a view of the measuring volume MV from the direction of arrows a—a of FIG. 1.

FIG. 2 is a plan view of the device of FIG. 1,

FIG. 4 is a schematic side view of an apparatus operating according to one embodiment of the three-component process, FIG. 5 is a plan view of the device of FIG. 4, and FIG. 6 is a view similar to that of FIG. 4 concerning the construction of a modified device.

DESCRIPTION OF THE PREFERRED EMBODIMENT

Figure 3:
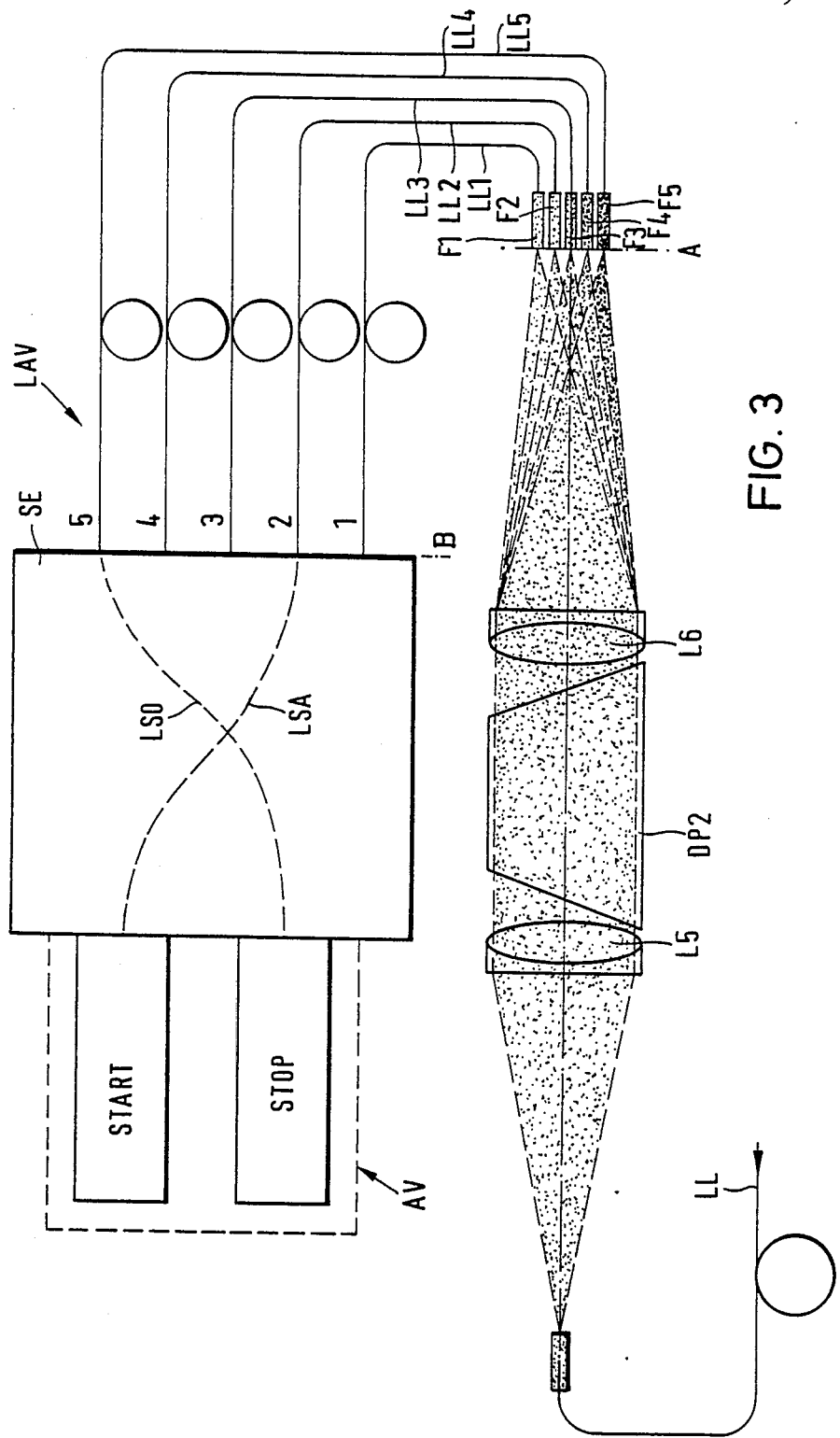
FIG. 3 is a schematic view of an embodiment of the light receiver and the evaluating means.

According to FIG. 1, the beam of a laser source; e.g., of an $Ar^+$-ion laser operating in multicolor mode, is enlarged by the two lenses L1 and L2 and deflected at right angles by prism P1. A further prism P2 provided at a glass plate GP along the optical axis of the lens systems L3 and L4 receives the laser beam emitted from prism P1 to further conduct it along the optical axis. By this means, the laser beam is reflected into the optical axis of the system. Between prism P2 and the first lens system L3, there is mounted a dispersion prism DP (e.g., Amiciprism) which, via a gear G, is rotatable about the optical axis by a motor M. In the dispersion prism DP, the individual colors C1 to C5 of the multicolor laser beam undergo different angular deviations so that, upon focusing by the achromatic lens L3, differently colored beams of mutually parallel axes are formed in the measuring volume MV, the focusing points F1 to F5 being situated along a common axis which extends towards the flow vector to be measured.

FIG. 1a shows a view of the measuring volume MV from the direction of arrows a—a of FIG. 1. The distances between beams C1 to C5 differ from one another subject to the type of laser used. In case of an $Ar^+$ion laser, the wavelengths of the individual colors are as follows: 514 nm, 496 nm, 488 nm, 476 nm and 465 nm. The mutual distances between the focusing points which correspond to spaces between said wavelengths are unequal.

If the plane in which the partial beams are situated is adjusted in parallel to the flow direction, a particle flying through all of the beams produces five successive stray light pulses. The stray light being collected by the external region of the first lens L3 and being parallel-directed. Upon passing the common dispersion prism D of the transmitting and receiving beams, the stray light of the differently colored beams separated in the measuring volume is combined to form one common parallel beam, and, by the second lens L4, it is imaged in one sole point of about 10 $\mu$m diameter, located in the hole of a disk diaphragm LB behind which the inlet of a light guide LL is arranged. Thus, the incident laser beam LS is reflected into the system along its optical axis while the returning beam encloses the incident beam and exclusively extends about the optical axis to the light guide LL.

If, by means of motor M, the dispersion prism DP is turned about the optical axis, the plane of the parallel beams in the measuring volume MV is shifted. Even in case of an inexact axial alignment of the dispersion prism DP, the observed stray light is imaged, in each rotational position, in exactly the same point in the disk diaphragm plane. Hence, readjusting the hole plane is unnecessary.

Light guide LL forms part of the light receiving unit LAV shown in FIG. 3. A divergent, multicolored light beam emerging from the light guide LL is parallel-directed by lens L5. By a second dispersion prism DP2 or a graticule, the different colors undergo various deflections. A lense L6 is mounted downward of the dispersion prism DP2. The individual colors F1 to F5 are focused at various points in the focal plane A of said lense L6. From said focusing points, further light guides LL1 to LL5 extend to the inputs of a selection means SE to which the evaluating device AV is connected which accommodates a start pulse generator START and a stop pulse generator STOP. Within the switching means SE, the start pulse generator START and the stop pulse generator STOP may be connected via a light guide LSA to any of the light guides LL1 to LL5, so that the start and stop pulses may be initiated by optional combinations of the partial beams.

It is possible alternatively to provide in the focal plane A photodetectors producing electrical signals if a light beam of the respective color impinges upon them. If so, the selection means SE is not of an optical but of an electrical type whose input provides for the pulses corresponding to the individual colors, the pulses to be supplied to the evaluating means AV being selectible.

Since the beams in the measuring volume MV have different colors, selectivity of the stray light from the individual beams is improved. An advantage is that only one sole rotating optical element is required, viz. the dispersion prism DP. Further, only one sole disk diaphragm LB is required, thus improving space filtering. The dispersion prism DP is not only used for the transmitting beam, but also for the receiving beams.

The foregoing passages describe a two-component measuring system which, as to its function, substantially corresponds to the system of U.S. Pat. No. 3,941,477. With reference to FIGS. 4 and 5, a three-component system will be dealt with now which, as to its function, substantially corresponds to that of British Patent No. 2,109,548.

According to FIG. 4, a multicolored laser beam LS, supplied via a polarization-maintaining "single-mode"-light guide LL1, is parallel-directed by lens L1. In a polarization beam splitter PS, splitting is effected into vertically and horizontally polarized beams. The vertically polarized beam is further conducted rectilinearly, while the horizontally polarized beam is deflected at right angles and guided to a prism P3 which directs said beam in parallel to the vertically polarized beam. Both beams are supplied, in parallel to and spaced from the optical axis, to the dispersion prism DP to be subsequently focused on the measuring volume MV via the first lens L3. The beams intersecting in the measuring volume MV in different points have the same color in each point, while their polarization directions are different. The differently colored stray light is combined again in the dispersion prism DP to form one beam which moves along the optical axis and is focused by the second lens L4. In the exit beam path of lens L4, there is a polarization prism PP in which the beam is split up into two portions polarized vertically relative to each other, each of said two components being focused on the inlet of one of the light guides LLa and LLb. Each of said components contains the information of various stray light colors which, in the subsequently connected light receiving means, are separated again.

Each of said components is clearly assigned to the beams polarized vertically with respect to each other.

The marginal range of lens 4 contains apertures for the free passage of the laser beams directed to the measuring volume MV. Lens L1, L4 and L3 as well as the polarization beam divider PS and the dispersion prism DP are accommodated in a tubular optical head OK which may be rotated in total thus avoiding a rotation of the dispersion prism DP relative to the other components. The respective angle of rotation of the optical head OK may be read.

Also in case of the embodiment of FIGS. 4 and 5, there are produced in the measuring volume MV a number of spatially separated colors C1 to C5 which form focusing points along a common straight line.

FIG. 6 shows a modified embodiment in which two laser beams polarized vertically relative to each other are conducted by light guides LLI and LLII to extend in parallel and in spaced relationship to the optical axis of the system. The polarization beam divider PS and prism P3 of FIG. 4 are not required in this case. On the other hand, light guides LLI and LLII have to be of the polarization-maintaining type.

What is claimed is:

1. An apparatus for measuring flow vectors in gas currents, comprising:
    a laser light source,
    a subsequently positioned beam divider, the beam divider including a dispersion means for splitting the laser light into at least three partial beams of different colors,
    first lens means for focusing at juxtaposed points in a single measuring volume the at least three partial beams of different colors emitted from the beam divider to thereby provide at least three focusing points in the single measuring volume,
    second lens means conducting the light of the measuring volume to a light receiving means which splits the light received from the measuring volume into spatially separate components,
    an evaluating means connected to the light receiving means for producing a start pulse if a particle passes the focusing point of one of the at least three partial beams of different colors and for producing a stop pulse if the same particle subsequently passes the focusing point of another one of the least three partial beams of different colors,
    whereby, for the production of start and stop pulses, different pairs of components may be selected and supplied to the evaluating means.

2. An apparatus according to claim 1, characterized in that, in a first direction, the partial beams running to the measuring volume pass the dispersion means, while, in a second direction, the same dispersion means is traversed by the beams running from the measuring volume to the light receiving means.

3. An apparatus according to claim 1, wherein the dispersion means is rotatable about its optical axis.

4. An apparatus according to claim 1, wherein laser beams of a different polarization are supplied to the dispersion means and a polarization divider is provided behind the second lens system which supplies the light received from the measuring volume to two light guides.

5. An apparatus according to claim 1, wherein the inlet of the light receiving means, the second lens system, the dispersion means and the first lens system are arranged in order along the optical axis.

6. An apparatus according to claim 1, wherein the second lens system comprises at a distance from the optical axis apertures for the passage of differently polarized beams.

7. An apparatus according to claim 5, wherein the components provided along the optical axis are accommodated in a common housing rotatable about the optical axis.

8. An apparatus according to claim 5, further comprising a device for reflecting the laser light into the beam path between the second lens system and the dispersion means.

9. An apparatus for measuring the flow vector of a particle contained in gas currents flowing through a plurality of at least three light beams focused onto at least three juxtaposed locations within a measuring volume, comprising:
    receiving means for receiving reflections of said at least three light beams, reflected from said particle flowing through said at least three juxtaposed locations;
    selecting means for selecting a first and a second light beam from said plurality of at least three light beams;
    first signalling means for producing a first signal upon receipt of a reflection of said first light beam; and
    second signalling means for producing a second signal upon receipt of a reflection of said light beam.

10. An apparatus as claimed in claim 9, wherein said juxtaposed focusing locations being situated along a common axis within said measuring volume.

11. An apparatus as claimed in claim 10, further comprising:
    rotating means for rotating said common axis so as to align said common axis with the flow vector to be measured.

12. A method for measuring a flow vector of a particle contained in gas currents flowing through a measuring volume, comprising the steps of:
    emitting a light beam in a first direction;
    dividing the light beam into at least three partial beams;
    focusing said at least three partial beams onto at least three juxtaposed locations in a single measuring volume;
    receiving light reflected from said particle flowing through said at least three juxtaposed locations in said single measuring volume;
    selecting a first beam and a second beam from said at least three partial beams;
    producing a first signal upon receipt of light reflected from said particle flowing through the focusing location of said first beam in said single measuring volume; and
    producing a second signal upon receipt of light reflected from said particle flowing through the focusing location of said second beam in said single measuring volume.

13. A method as claimed in claim 12, wherein said step of receiving light reflected from said particle further comprises the steps of:
    collecting light reflected from said particle flowing through said juxtaposed locations;
    transmitting said collected light in a single light beam;
    receiving said transmitted single light beam; and
    dividing said received single light beam into said at least three partial beams.

14. A method as claimed in claim 13, wherein said step of transmitting said collected light in a single light beam is characterized in that the direction of said transmission is opposite t said first direction.

15. A method as claimed in claim 13, wherein said step of transmitting said collected light in a single light beam is characterized in that said single light beam encloses said light beam emitted in said first direction.

16. A method as claimed in claim 12, wherein said step of dividing the light beam comprises the step of dividing the light beam into partial beams of different colors.

17. A method for measuring flow vector of a particle contained in gas currents flowing through a measuring volume, comprising the steps of:
   emitting a light beam;
   dividing the light beam into a plurality of differently polarized light beams;
   dividing each of said polarized light beams into at least three differently colored polarized light beams;
   focusing said at least three differently colored polarized light beams into juxtaposed locations within a single measuring volume;
   receiving light reflected from said particle flowing through said juxtaposed locations in said single measuring volume;
   combining said received light into a single light beam;
   dividing said single light beam into said plurality of differently polarized light beams;
   dividing each of said polarized light beams into said at least three differently colored polarized light beams;
   selecting a first light beam and a second light beam from said at least three light beams;
   producing a first signal upon receipt of light reflected from said particle flowing through the focusing location corresponding to said first light beam; and
   producing a second signal upon receipt of light reflected from said particle flowing through the focusing location corresponding to said second light beam.

18. An apparatus for measuring flow vectors of particles in gas currents flowing in a measuring volume, comprising:
   a laser light source;
   dispersion means for splitting the laser light into at least three partial beams of different colors;
   first focusing means for focusing, at juxtaposed points in said measuring volume, the at least three partial beams of different colors emitted from the dispersion means;
   second focusing means for conducting light emanating from said measuring volume;
   light receiving means for receiving light conducted by said second focusing means and for splitting the received light into spacially separate components; and
   evaluating means, connected with the light receiving means, for producing a start pulse when a particle crosses the focusing point of a first one of said partial beams, and for producing a stop pulse when the same particle subsequently crosses the focusing point of a second one of said partial beams;
   said first and second partial beams being selected and supplied to said evaluating means.

19. An apparatus as claimed in claim 18,
   wherein said laser light beam emanating from said laser source passes through said dispersion means in a first direction, and wherein
   said light emanating from said measuring volume passes through said dispersion means in a second direction opposite to said first direction.

20. An apparatus as claimed in claim 18, wherein said dispersion means being rotatable about its optical axis.

21. An apparatus as claimed in claim 18, further comprising:
   first polarizing means for supplying beams having different polarizations to said dispersion means;
   second polarizing means for supplying light emanating from said measuring volume having different polarizations to different light guides respectively.

22. An apparatus as claimed in claim 18, wherein
   said second focusing means being disposed between said light receiving means and said dispersion means;
   said dispersion means being disposed between said second focusing means and said first focusing means; and
   said light receiving means, said second focusing means, said dispersion means and said first focusing means share a common optical axis.

23. An apparatus as claimed in claim 18, wherein
   said second focusing means having apertures spaced apart from the optical axis thereof, for passing differently polarized beams therethrough.

24. An apparatus as claimed in claim 22, further comprising:
   a single housing for accommodating said light receiving means, said second focusing means, said dispersion means, and said first focusing means;
   wherein said single housing being rotatable about said common optical axis.

25. An apparatus as claimed in claim 22, further comprising:
   a reflecting means for reflecting said laser light beam onto said common optical axis between said second focusing means and said dispersion means.

* * * * *